United States Patent Office.

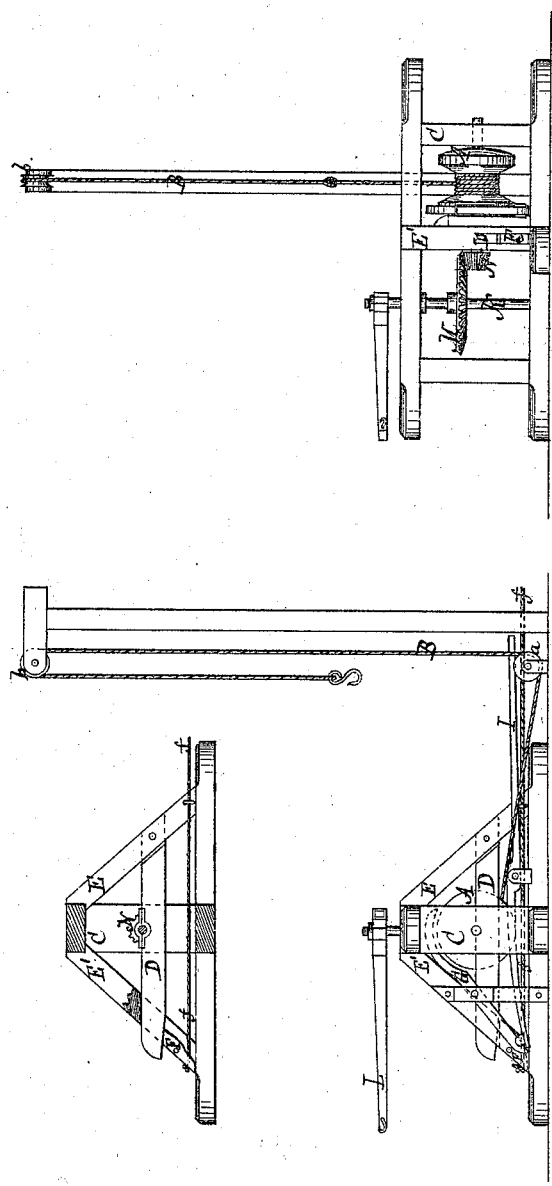

JAMES G. STEPHENSON, OF BUCYRUS, OHIO.

Letters Patent No. 94,921, dated September 14, 1869.

IMPROVED HORSE-POWER.

The Schedule referred to in these Letters Patent and making part of the same.

*To all whom it may concern:*

Be it known that I, JAMES G. STEPHENSON, of Bucyrus, in the county of Crawford, and State of Ohio, have invented a new and useful Improvement in Horse-Powers; and I do hereby declare that the following is a full, clear, and exact description thereof, reference being had to the accompanying drawings, making part of this specification, and to the letters of reference marked thereon.

The nature of my invention consists in the peculiar arrangement and operation of a trip and pivoted bar for throwing the parts in and out of gear; also, of a lever and brake for checking the speed of the drum upon which the rope is wound.

To enable those skilled in the art to which my invention appertains, to make and use the same, I will proceed to describe its construction and operation.

In the drawings—

Figure 1 is an end view.

Figure 2 is a front view.

Figure 3 is a vertical section, taken in the line $x\ x$, fig. 2.

A is a drum, to which is attached one end of the rope B, which passes around pulleys, $a\ b$, the upper one of which is attached to a crane or projecting beam, and the lower one placed near the ground.

The outer end of the shaft A', which carries the drum A, is journalled in a post, C, which forms part of the frame-work, and the inner end is journalled in a bar, D, one end of which is pivoted to a brace, E, forming part of the frame, the other end working in a slot in a brace, E', opposite the brace E.

Working in said slot in the brace E', immediately under the free end of the pivoted bar D, is a trip, F, consisting of a short lever pivoted near its centre, and having a rope, $f$, attached to its lower end.

G is a brake, pivoted to the brace E', the upper portion engaging with the drum A, and the lower end resting upon the short arm of the lever I, which is pivoted near its front end to or near the frame E', the rear end extending back toward the pulley $a$.

K is a vertical shaft, on the upper end of which is a lever, L, to which the power is applied, and below said lever, on said shaft K, is a bevel-wheel, M, which engages with a pinion, N, on the inner end of the shaft A'.

The operation is as follows:

Power being applied to the lever L, the weight or load to be elevated is attached to the free end of the rope B. On pulling the rope $f$, the upper end of the trip F raises the pivoted bar D, and throws the pinion N in gear with the wheel M, when the drum A revolves, winding up the rope B, and elevating the load. When the load has reached the desired height, and is taken in charge by the person waiting to receive it, the rope B is released, when the free end of the pivoted bar D falls by its own weight, and throws the pinion N out of gear, leaving the drum A free to revolve in the opposite direction, and allow the rope B to unwind.

In case the rope $f$ should break, or from any other cause the weight on the end of rope B should descend, or the drum A should revolve too rapidly, by pressing down the long arm of the lever I, the brake G is brought to bear upon the drum A, and its revolution checked, or entirely stopped, if desired.

Having thus described my invention,

What I claim as new, and desire to secure by Letters Patent, is—

1. The trip F and pivoted bar D, or their equivalents, for throwing the parts in and out of gear, substantially as shown and described.

2. The brake G and lever I, when arranged and operated as shown and described.

JAMES G. STEPHENSON.

Witnesses:
  JNO. DEMPSEY,
  S. RANK.